(12) United States Patent
McEwen et al.

(10) Patent No.: US 7,862,730 B2
(45) Date of Patent: Jan. 4, 2011

(54) SYSTEMS AND METHODS FOR SEPARATING HYDROCARBONS FROM WATER

(75) Inventors: Greg McEwen, Bangkok (TH); Joe Sherwood, Columbus, TX (US)

(73) Assignee: M-I L.L.C., Houston, TX (US)

( * ) Notice: Subject to any disclaimer, the term of this patent is extended or adjusted under 35 U.S.C. 154(b) by 0 days.

(21) Appl. No.: 12/170,028

(22) Filed: Jul. 9, 2008

(65) Prior Publication Data
US 2009/0014392 A1 Jan. 15, 2009

Related U.S. Application Data

(60) Provisional application No. 60/948,901, filed on Jul. 10, 2007.

(51) Int. Cl.
*B01D 21/00* (2006.01)
*B01D 17/00* (2006.01)
*B01D 17/04* (2006.01)
*B01D 17/028* (2006.01)
*C02F 1/00* (2006.01)

(52) U.S. Cl. .............. 210/802; 210/800; 210/803; 210/767; 210/744; 210/708

(58) Field of Classification Search .......... 210/802, 210/522
See application file for complete search history.

(56) References Cited

U.S. PATENT DOCUMENTS 4,136,012 A * 1/1979 Louboutin et al. ......... 210/208
4,761,225 A 8/1988 Breslin
4,846,965 A * 7/1989 Clifft et al. ............... 210/96.1

(Continued)

OTHER PUBLICATIONS

Notification of Transmittal of The International Search Repor and The Written Opinion of the International Searching Authority, or The Declaration for PCT Application No. PCT/US2008/069616, dated Dec. 30, 2008, (3 pages).

(Continued)

*Primary Examiner*—Duane Smith
*Assistant Examiner*—Paul J Durand
(74) *Attorney, Agent, or Firm*—Osha Liang LLP

(57) ABSTRACT

A system for separating hydrocarbons from water, the system including an inlet for receiving a fluid, the fluid including a water phase and a hydrocarbon phase, and a separation tank having a first partition and a second partition, wherein the first partition is configured to receive the fluid from the inlet. Furthermore, the system includes a first outlet configured to receive the water phase from the first partition, a second outlet configured to receive the hydrocarbon phase from the second partition, and a support structure configured to receive the water phase from the first outlet and the hydrocarbon phase from the second outlet. Also, a method of separating a fluid into a water phase and a hydrocarbon phase, the method including injecting the fluid containing the water phase and the hydrocarbon phase into a separation tank. The method further includes separating the water phase from the hydrocarbon phase, wherein the separating includes transmitting the fluid through a plurality of baffles, collecting the water phase, and collecting the hydrocarbon phase.

23 Claims, 5 Drawing Sheets

U.S. PATENT DOCUMENTS

| | | | | |
|---|---|---|---|---|
| 5,173,195 | A | * | 12/1992 | Wright et al. ............... 210/802 |
| 5,228,983 | A | * | 7/1993 | Nims ......................... 210/122 |
| 5,248,439 | A | * | 9/1993 | Derrell ....................... 210/708 |
| 5,435,910 | A | * | 7/1995 | Verret ......................... 210/86 |
| 5,536,409 | A | * | 7/1996 | Dunkers ..................... 210/519 |
| 5,570,744 | A | | 11/1996 | Weingarten et al. |
| 5,833,397 | A | * | 11/1998 | Horton, III .................. 405/204 |
| 5,961,841 | A | | 10/1999 | Bowers |
| 6,845,821 | B2 | | 1/2005 | Bouma et al. |

OTHER PUBLICATIONS

Written Opinion of the International Searching Authority for PCT Application No. PCT/US2008/069616, dated Dec. 30, 2008, (3 pages).

International Search Report for PCT Application No. PCT/US2008/069616, dated Dec. 30, 2008, (3 pages).

* cited by examiner

US 7,862,730 B2

SYSTEMS AND METHODS FOR SEPARATING HYDROCARBONS FROM WATER

CROSS-REFERENCE TO RELATED APPLICATIONS

This application, pursuant to 35 U.S.C. §119(e), claims priority to U.S. Provisional Application Ser. No. 60/948,901 filed Jul. 10, 2007. That application is incorporated by reference in its entirety.

BACKGROUND

1. Field of the Disclosure

Embodiments disclosed herein relate generally to systems and methods for separating hydrocarbons from water. More specifically, embodiments disclosed herein relate to systems and methods for separating hydrocarbons from water on offshore drilling rigs. More specifically still, embodiments disclosed herein relate to systems and methods for separating hydrocarbons from water using a self-contained modular based separator.

2. Background Art

Offshore drilling and production platforms used in the recovery of hydrocarbons from subterranean structures disposed beneath the ocean often include a number of structural support members for supporting a work area, as well as components of the recovery operation. During the recovery of hydrocarbons, potentially hazardous and/or environmentally damaging substances, such as residual hydrocarbons, oil, grease, drilling fluids, surfactants, and other organic contaminants may be spilled onto the work areas. These fluids may also be mixed with water, solids, and cleaners by drilling operators hosing down the work area during normal drilling operations. In some operations, the substances may be allowed to wash directly into the ocean, potentially causing significant ecological damage.

Because such substances may be environmentally damaging if allowed to spill into the ocean water, in certain drilling operations, the work area is designed to contain the substances from washing overboard. Often, the work areas in such operations are designed such that the substances wash into sump containers or tanks, wherein the oil is allowed to separate from the water, such that the water may be pumped back into the ocean, while the oil is disposed of according to local regulations.

When techniques for separating the oil from water are used, the techniques rely on retention time as the primary separation mechanism. In such sump based systems, hydrocarbons, such as paraffins, grease, and refined hydrocarbons eventually coat the interior surface of the sumps as water evaporates. Thus, as the separated water is removed from the sump, the water may still include significant portions of hydrocarbons. In such systems, the water is typically discharged overboard, while the solids and hydrocarbons settle together, and are thus discharged together. These retention reservoirs are often large, take up significant rig space, where space is at a premium, and do not provide adequate separation of hydrocarbons and solids from water.

Accordingly, there exists a continuing need for systems and methods for separating hydrocarbons from water during drilling operations.

SUMMARY OF THE DISCLOSURE

In one aspect, embodiments disclosed herein relate to a system for separating hydrocarbons from water including an inlet for receiving a fluid, the fluid including a water phase and a hydrocarbon phase. The system also includes a separation tank having a first partition and a second partition, wherein the first partition is configured to receive the fluid from the inlet. Furthermore, the system includes a first outlet configured to receive the water phase from the first partition, a second outlet configured to receive the hydrocarbon phase from the second partition, and a support structure configured to receive the water phase from the first outlet and the hydrocarbon phase from the second outlet.

In another aspect, embodiments disclosed herein relate to a method of separating a fluid into a water phase and a hydrocarbon phase, the method including injecting the fluid containing the water phase and the hydrocarbon phase into a separation tank. The method further includes separating the water phase from the hydrocarbon phase, wherein the separating includes transmitting the fluid through a plurality of baffles, collecting the water phase, and collecting the hydrocarbon phase.

Other aspects and advantages of the invention will be apparent from the following description and the appended claims.

DETAILED DESCRIPTION

In one aspect, embodiments disclosed herein relate to systems and methods for separating hydrocarbons from water. More specifically, embodiments disclosed herein relate to systems and methods for separating hydrocarbons from water on offshore drilling rigs. More specifically still, embodiments disclosed herein relate to systems and methods for separating hydrocarbons from water using a self-contained modular based separator.

Figure 1:
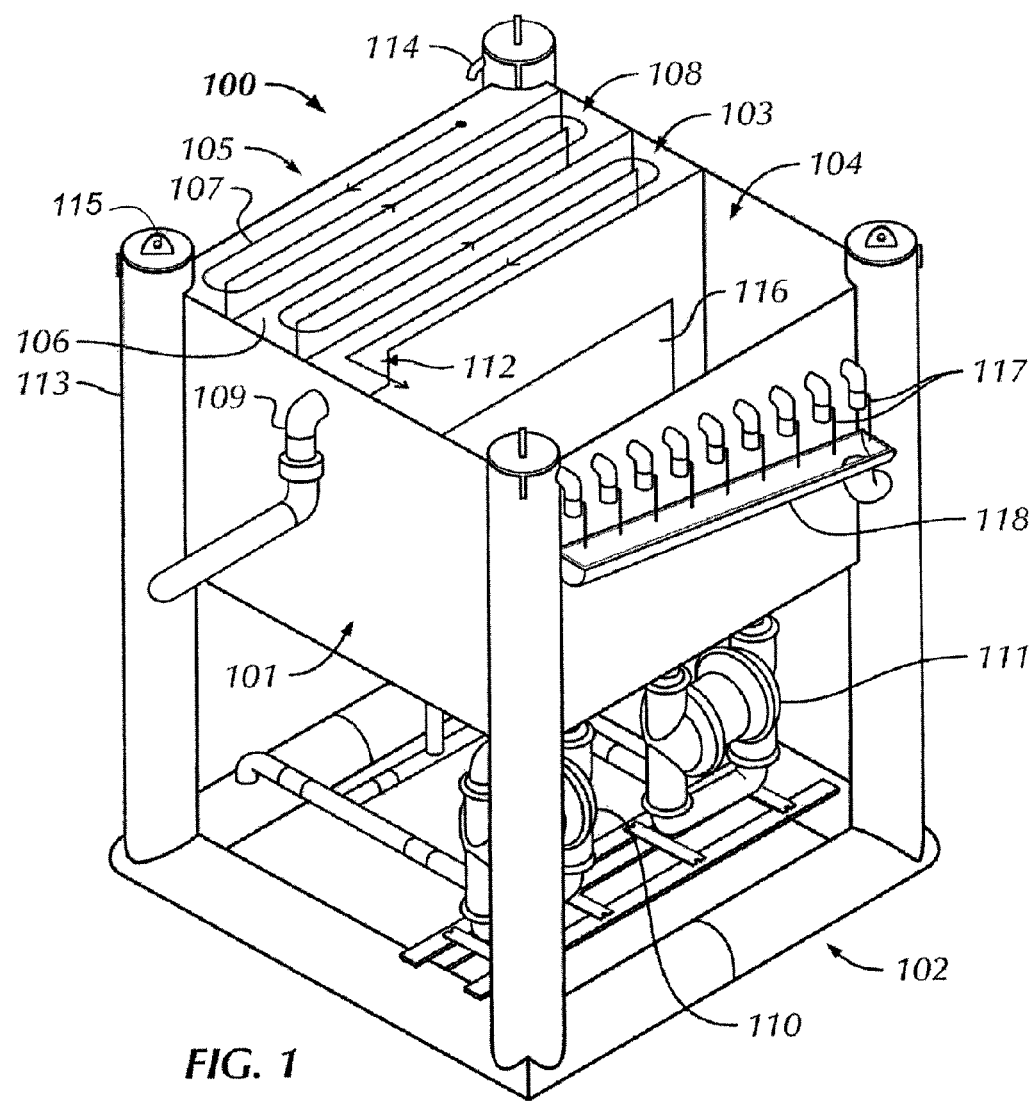
FIG. 1 is a side perspective view of a system for separating hydrocarbons from water according to embodiments of the present disclosure.

Referring to FIG. 1, a side perspective view of a system for separating hydrocarbons from water according to embodiments of the present disclosure is shown. In this embodiment, separator 100 includes a separation tank 101 disposed in a support structure 102. Separation tank 101 is divided into a first partition 103 and a second partition 104, first partition 103 having an inlet 105 for receiving a fluid. As illustrated, inlet 105 may include a spillover gate, through which a fluid may be transmitted, however, according to other aspects of the present disclosure, inlet 105 may include a series of pipes, nozzles, valves, or other means to control a flow of a fluid into separation tank 101.

Initially, the fluid transmitted through inlet 105 may include a water phase, a hydrocarbon phase, and/or a dense phase. As used herein, dense phase refers to a solid phase, or other phase, which has sufficient density, viscosity, or other property preventing conveyance through separator 100 without assistance. Accordingly, the dense phase may include solids, particulate matter, relatively high viscosity fluids, hydrocarbons, drilling muds, or other materials known to those of ordinary skill in the art. The fluid may be injected from a sump (not illustrated) on the drilling rig, a collection tank, a holding reservoir, gravity fed from an above located deck, or routed directly from the rig floor, shaker house, or centrifuge deck. In certain embodiments, the fluid may include drilling fluid that returned from a wellbore during a drilling operation, while in other embodiments, the fluid may be spillover fluids from other aspects of drilling. The specific source of the fluid to be separated is not meant as a limitation on the scope of the present disclosure, and as such, those of ordinary skill in the art will appreciate that any fluid having a water phase, a hydrocarbon phase, and/or a dense phase may benefit from the methods and systems disclosed herein. In certain embodiments, inlet 105 may be configured to negate overwhelming separator 100 during surges and/or periods of large fluids volume from gravity feeds or pumps by including a "soft" receiver. Those of ordinary skill in the art will appreciate that a soft receiver may have an overflow or other design, such that only a predetermined volume of fluid may be injected into separator 110. By controlling the volume of fluid entering separator tank 101, as more consistent level of water clarity may be achieved.

First partition 103 of separation tank 101 includes a plurality of baffles 106 configured to provide a weir flow to the fluid as it enters separator 100. Those of ordinary skill in the art will appreciate that baffles may include any structure configured to increase the surface area of separation tank 101, thereby increasing the length of a flow path 107. Baffles 106 may extend any depth into first partition 103 that achieves the desired flow path 107. Thus, in certain embodiments, baffles may extend into, for example, less than twenty-five percent, fifty percent, or greater than seventy-five percent, of the total depth of first partition 103. Examples of alternate baffle designs may include using of a series of plates and valves to control the flow of fluids therethrough, however, other methods of creating a weir flow path known to those of ordinary skill in the art may also be used.

Initially, the fluid to be cleaned may be injected into first partition 103, such that a flow according to flow path 107 is achieved. To achieve flow path 107, plurality of baffles 106 may be disposed in first partition 103 with a series of gate sections 108. The specific design of gate sections 108 may vary according to the size and requirements of separator 100, however, in the embodiment shown, gate sections 108 include a lowered section at opposite ends of corresponding baffles 106. As such, the fluid may enter first partition 103 through inlet 105, and follow flow path 107. Flow path 107, as illustrated, may include a serpentine shaped path, or in other aspects, may include other paths that increase the time the fluid remains in first partition 103. Those of ordinary skill in the art will appreciate that the longer the fluid remains in first partition 103, the greater separation of hydrocarbons from water may occur. Additionally, the longer the fluid remains in first partition 103, the greater quantity of dense phase may fall/drop out of the water phase. Thus, the time the fluid remains in first partition 103 may determine the level of dense phase drop out, as well as the level of hydrocarbon/water separation.

According to other aspects of the present disclosure, separator 100 may include other methods to control the time the fluid remains in first partition 103. For example, in alternate embodiments, baffles 106 may extend across the entire width of separation tank 101, and may include a plurality of release valves (not illustrated). In such a design, the release valves may control the flow rate of the fluid through first partition 103. As such, a drilling operator may determine and/or change the flow rate according to the requirements of the separatory operation.

As illustrated, separator 100 includes five baffles in first partition 103, and first partition 103 includes approximately half the total volume of separation tank 101. However, in other embodiments, first partition 103 may include a greater volume of separation tank 101, such as, for example, sixty percent, seventy-five percent, or ninety percent of separation tank 101 by volume. By increasing the relative volume of first partition 103 to second partition 104, those of ordinary skill in the art will appreciate that the level of hydrocarbon/water separation may be increased. Additionally, by increasing the volume of first partition 103, additional baffles 106 may be included to increase the length of flow path 107. By increasing the length of flow path 107, and the time the fluid remains in first partition 103, a greater degree of separation and dense phase drop out may be achieved.

As the fluid flows down the last baffled section of first partition 103, a first outlet 109 is configured to remove the water phase from first partition 103. First outlet 109 may include a U-shaped, J-shaped, or S-shaped pipe that extends into the last baffled section below the hydrocarbon/water level, and removes the water from first partition 103, while allowing the hydrocarbon to remain separated on top of the water phase. In certain embodiments, adjustment of the water phase level may be achieved by actuation of an external valve, thereby adjusting the flow of the hydrocarbon phase into second partition 104. However, in alternate embodiments, a flow of the water phase may be regulated with a waterfall area disposed between first partition 103 and first outlet 109. The waterfall area allows the water phase to overflow out of first partition 103 after passing through a low under weir, and into first outlet 109 for removal. Additionally, the waterfall area may increase the separation of the water phase from the hydrocarbon phase, thereby further decreasing the amount of residual hydrocarbon phase in the water phase.

By removing the water phase from first partition 103, while allowing the hydrocarbon phase to remain in first partition 103, the substantially clean water phase may be removed from separation tank 101, while the hydrocarbon phase is allowed to flow into second partition 104. Those of ordinary skill in the art will appreciate that in alternate embodiments, multiple first outlets 109 may be disposed on separator tank 101, such that one outlet may receive a flow of water phase from a lower level of separator tank 101, while another outlet receives a flow of water phase from a middle level of separator 101. By providing multiple first valves 109, the water phase may be removed from separator tank with greater control, thereby further increasing the clarity and efficiency of separator 100. Those of ordinary skill in the art will appreciate that in certain embodiments, separator 100 may have multiple first valves 109 including a multiple J-shaped, U-shaped, or S-shaped pipes.

Those of ordinary skill in the art will further appreciate that as the hydrocarbon phase flows into second partition 104, a volume of water may also enter second partition 104. In certain embodiments, the volume of water phase entering second partition 104 may be greater than the volume of hydrocarbon phase. However, even if a greater volume of water phase than hydrocarbon phase enters second partition 104, the hydrocarbons will still remain relatively separated from the water phase. Additionally, adjusting a flow rate of the water phase through first outlet 109 may control the flow rate of the hydrocarbon phase into second partition 104. As such, the volume of water phase flowing over the last baffled section into second partition 104 may also be regulated.

To control a flow rate of water phase through first outlet 109, the conduit included in first outlet 109 may have one or more valves that may be adjusted to provide an optimal flow rate therethrough. In certain embodiments, the water phase may be siphoned from first partition 103, while in other embodiments, pumps may be connected to first outlet 109 to facilitate the flow of the water phase. Those of ordinary skill in the art will appreciate that in certain embodiments, first outlet 109 may be fluidly connected to a first pump 110, a second pump 111, or both pumps 110 and 111. As such, the flow of the water phase from separation tank 101 may be controlled/regulated.

In some embodiments, first outlet 109 may also include one or more sensors for determining, for example, a flow rate of water phase through first outlet 109 and/or a density of the fluid flowing therethrough. In other embodiments, sensors may be included to determine the level of the hydrocarbon phase with respect to the water phase. Examples of sensors that may be used with first outlet 109 include density sensors, conductivity sensors, level sensors, and flow rate sensors. Those of ordinary skill in the art will appreciate that sensors may also be included in the last baffled section of separation tank 101, along a recessed portion 112 of first partition 103, or in second partition 104. The plurality of sensors may thus provide a drilling operator flow rates of fluids, hydrocarbon phase, and water phase, as well as provide information that may be used to determine the location of the hydrocarbon/water separation level. Such sensors may provide the drilling operator data necessary to optimize the flow rate of water phase exiting through outlet 109, as well as the flow rate of fluid into second partition 104. In certain embodiments, the plurality of sensors may be connected to, for example, a programmable logic controller ("PLC"), such that the flow rates etc., may be calculated for the drilling operator. In still other embodiments, the sensors may be connected to a computer, or other device capable of logging data, and providing the drilling operator with data indicating flow rates of fluids over time, a volume of hydrocarbon and/or water phase collected, as well as data indicating the efficiency of separator 100 or components thereof. Such data may be either stored locally in memory configured to be used by the PLC or computer, or may be stored/analyzed remotely, such as by waste management or drilling software.

Still referring to FIG. 1, after the water phase is removed from first partition 103 through first outlet 109, the fluid is piped into support structure 102. As illustrated, in this embodiment, support structure 102 includes a plurality of substantially hollow legs configured to hold fluids. As the water phase enters support structure 102, the water phase may be routed between a plurality of legs 113 of support structure 102. Thus, one or more of legs 113 may be used to store the water phase, until the water phase may either be discarded overboard or used in other aspects of the drilling operation. Those of ordinary skill in the art will appreciate that the number of legs 113 used to store the water phase may vary according to the volume of the water phase removed from separation tank 101. However, in certain aspects, legs 113 capable of holding at least 0.5 barrel of water phase each may be preferable. In such an embodiment, the volume of the water phase stored may include at least 1 barrel, if the drilling operator uses at least two legs 113 for storing the water phase. In other embodiments, it may be preferable to store more water phase, and as such, three or even four of legs 113 may be used to store the water phase. To prevent contamination of the water phase stored in legs 113 and/or damage to legs 113 themselves, those of ordinary skill in the art will appreciate that legs 113 may be coated with a material to prevent legs from, for example, rusting.

A plurality of vents 114 may also be disposed on legs 113. Vents 114 may be used to decrease a pressure inside legs 113 or support structure 102, or to prevent a pressure build-up from occurring. Legs 113 may also include a plurality of lift points 115 disposed, for example on top of legs 113, to allow separator 100 to be moved on or off of a drilling rig.

After the hydrocarbons and residual water phase is transmitted from first partition 103 into second partition 104, the hydrocarbons may be allowed additional settling time. Such additional settling time may allow for more discrete separation, and a more defined level of hydrocarbons versus water phase. To assist such separation, secondary baffles 116 may be included. Secondary baffles 116 may slow the transmittance of the fluid through second partition 104, thereby providing greater time to allow the hydrocarbons to separate from the water phase. Additionally, secondary baffles 116 may increase the flow path of the fluid through second partition 104, thereby providing additional time to allow any residual solids to drop out of the fluid.

When the hydrocarbon phase is adequately separated from the water phase, one of a plurality of valves 117 (i.e., secondary outlets) may be opened to allow the hydrocarbon phase to exit second partition 104. As illustrated, valves 117 are located at different levels, so that as hydrocarbons are removed from second partition 104, residual water phase may be retained in second partition 104. As the hydrocarbons exit through valves 117, they may collect in conduit 118. As illustrated, conduit 118 may include angled piping, thereby allowing hydrocarbons to be gravity fed into one of legs 113 for storage. In other embodiments, conduit 118 may feed hydrocarbons into multiple legs 113, or into a separate storage reservoir (not illustrated). Legs 113 may include a plurality of switches, such that as legs 113 are filled with hydrocarbon and/or water phase, when a high level point is reached, a switch may activate an electric solenoid, allowing air into the pump 110/111 associated with respective leg 113. The hydrocarbon phase and/or water phase may then be pumped out of separator 100. Similarly, when a low level is reached, a second switch may be actuated to stop the pump 110/111 from removing the associated fluid from legs 113. Thus, the removal of hydrocarbon phase and water phase from legs 113 may be automated.

Figure 2:
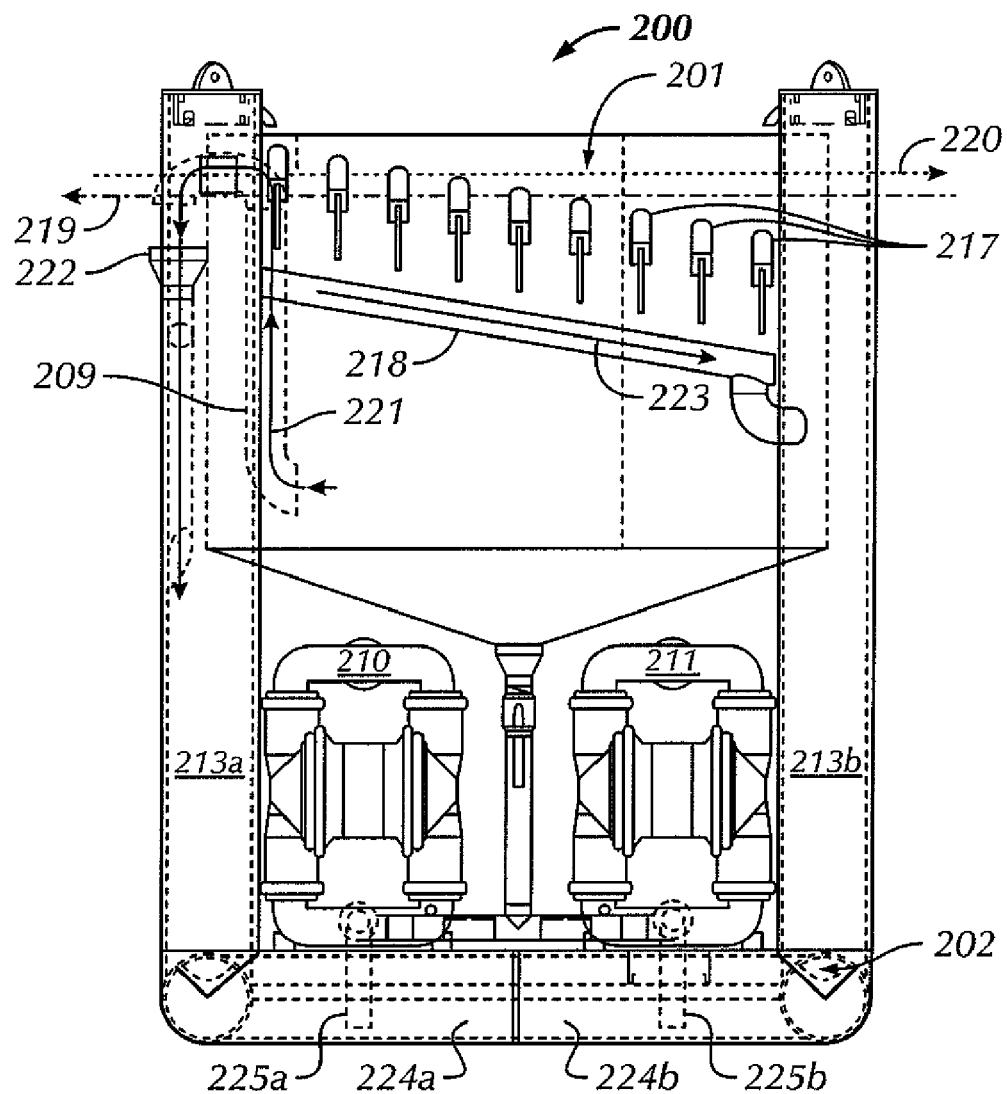
FIG. 2 is a front schematic representation of a separator according to embodiments of the present disclosure.

Referring now to FIG. 2, a front schematic representation of a separator 200 according to embodiments disclosed herein is shown. In this embodiment, separator 200 includes a separation tank 201 and a support structure 202 having a plurality of legs 213.

This front view also illustrates a first outlet 209 for removing water phase from separation tank 201 disposed at least partially within separation tank 201. As illustrated, first outlet 209 extends into separation tank 201 below a fluid level 219 (as opposed to a weir level 220). When a drilling operator determines the water phase is separated from the hydrocarbons, and sufficient dense phase has dropped out of the fluid, the operator may actuate a first outlet valve (not independently illustrated) to begin removing water phase from separation tank 201 along flow path 221. Water phase is thus removed out of separation tank 201 to external piping 222 and into leg 213a. Those of ordinary skill in the art will appreciate that in other embodiments, external piping 222 may not be necessary, and as such, first outlet 209 may allow water phase to be directly removed from separation tanks 201 into leg 213a.

Similarly, when the drilling operator determines that hydrocarbons may be removed from separation tank 201, one of a plurality of valves 217 may be actuated to allow the flow of hydrocarbons therethrough. Hydrocarbons may be removed from separation tank 201 through valves 217 and into a conduit 218. The hydrocarbons may then flow along path 223 and into leg 213b for storage.

As described above, legs 213, as well as other sections of support structure 202 may be used for the storage of hydrocarbons, water phase, and/or other fluids. In this embodiment, substantially hollow support structure 202 uses both legs 213 and lower support sections 224 as storage reservoirs for separated products. When a drilling operator determines that one of the separated products, either hydrocarbons or water phase, is to be removed from separator 200, one of either first pump 210 or second pump 211 may be actuated. In this embodiment, the actuation of first pump 210 may remove water phase from leg 213a and lower support section 224a through a port 225a. Similarly, actuation of second pump 211 may remove hydrocarbon phase from leg 214b and lower support section 224b through port 225b. Accordingly, either hydrocarbon or water phase may be pumped from support structure 202 out of a discharge port (not shown) and out of separator 200. In one embodiment, recovered water phase may be pumped to secondary processing equipment for further cleaning, to active pits, or overboard if local environmental regulations allow. Recovered hydrocarbons may be pumped to active pits, to additional processing equipment, such as centrifuges or shakers, or to disposal reservoirs.

During operation of separator 200, one of pumps 210 or 211 may become damaged, or be taken out of operation for servicing. Those of ordinary skill in the art will appreciate that because pumps 210 and 211 may be fluidly connected, pump 211, which typically is used to remove hydrocarbons, may also be used to remove water phase. Similarly, pump 210, which is typically used to pump water phase, may be used to pump hydrocarbons. Because pumps 210 and 211 share fluid connections with separation tank 201 and support structure 202, the pumps may be used at the same time, such that both hydrocarbons and water phase may be removed from support structure 202 simultaneously (in separators 200 with multiple discharge ports).

Figure 3:
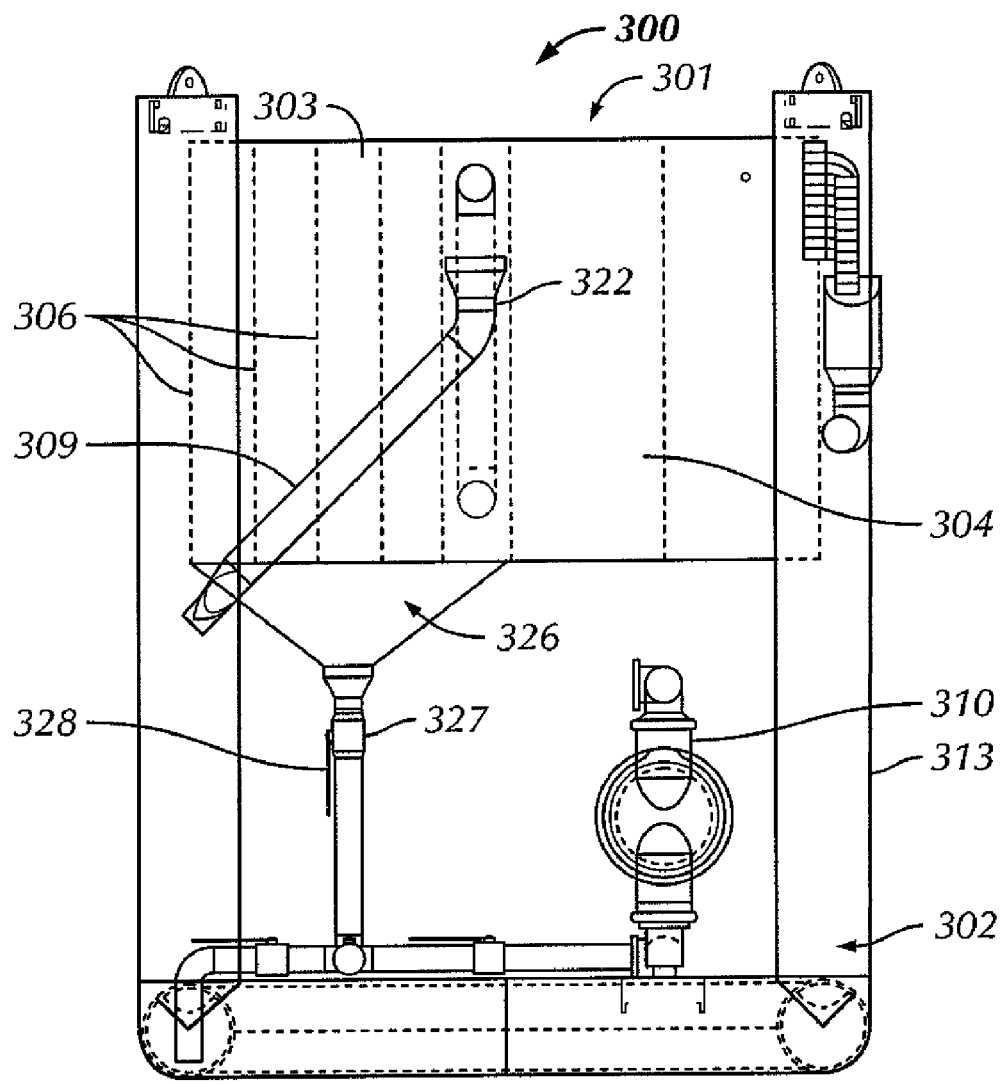
FIG. 3 is a side schematic representation of a separator according to embodiments of the present disclosure.

Referring to FIG. 3, a side view of a separator 300 according to embodiments of the present disclosure is shown. In this embodiment, separator 300 includes a separation tank 301 and a support structure 302 having legs 313. Separation tank 301 is divided into a first partition 303 and a second partition 304. A plurality of baffles 306 may provide a substantially serpentine flow path of fluids through first partition 303, as described with respect to FIG. 1.

As previously described, as the fluids travel through first partition 303, a dense phase that may be entrained in the fluid including, for example, drill cuttings, may fall out of the fluids. The dense phase may then collect in a collection portion 326 of first partition 303. As illustrated, the collection portion 326 may include an angled section configured to facilitate the movement of the dense phase through first partition 303 to a dense phase outlet 327. Those of ordinary skill in the art will appreciate that the angle of collection portion 326 may vary according to the type of dense phase being collected or the requirements of the separatory operation. In some embodiments, angles of, for example, 15°, 30°, or 60° of declination may be sufficient to facilitate the flow of the dense phase to dense phase outlet 327. However, in other embodiments, the angle of declination may be greater than 15° or greater than 60°. Thus, as the dense phase is removed from the fluid, the dense phase is transmitted into collection portion 326 whereby a drilling operator may open a valve 328 on outlet 327 to discharge the dense phase from separation tank 301. The removal of such a dense phase from separation tank 301 may occur via gravity settling or be assisted by actuation of, for example, pump 310.

Those of ordinary skill in the art will appreciate that a determination of when to discharge the dense phase from collection portion 326 may be a decision of a drilling operator followed by the manual actuation of valve 328 or plurality of various level sampling valves. However, in alternate embodiments, a plurality of sensors (not illustrated) may be disposed in collection portion 326 or outlet 327 to provide data indicating a dense phase level in collection portion 326. Examples of sensors that may be used include conductivity sensors, load cells, or level sensors. In a system using sensors to determine a fill level of collection portion 326, the sensors may be operatively connected to a PLC or computer for the collection of data and/or processing of such data. Separator 300 including a PLC may thereby inform a drilling operator of an optimum time to discharge the dense phase by providing the operator visual or aural signals. Alternatively, in certain embodiments, separator 300 may automatically institute a discharge cycle by opening valve 328 for a defined time interval.

Still referring to FIG. 3, a first outlet 309 is illustrated as extending into first partition 303. As water phase is removed from first partition 303 via first outlet 309, the water phase may travel along an exterior conduit 322 into a substantially hollow leg 313. First outlet 309 may also include one or more valves (not independently illustrated) that may be manually or automatically actuated to control the flow of water phase from first partition 303 to leg 313. As described above, a PLC or computer may be configured to determine a water/hydrocarbon separation level in first partition 303, such that water phase may be optimally discharged from first partition 303. Those of ordinary skill in the art will appreciate that generally, when the water phase is being discharged through first outlet 309, valve 328 controlling a dense phase discharge should remain closed. Likewise, when the dense phase is being discharged through outlet 327, water phase should not be discharged through first outlet 309. Those of ordinary skill in the art will further appreciate that in separators 300 having PLCs or computers, the discharge cycles of dense phase, water phase, and hydrocarbons may be regulated such that optimum levels of fluids in separation tank 301 are maintained.

Figure 4:
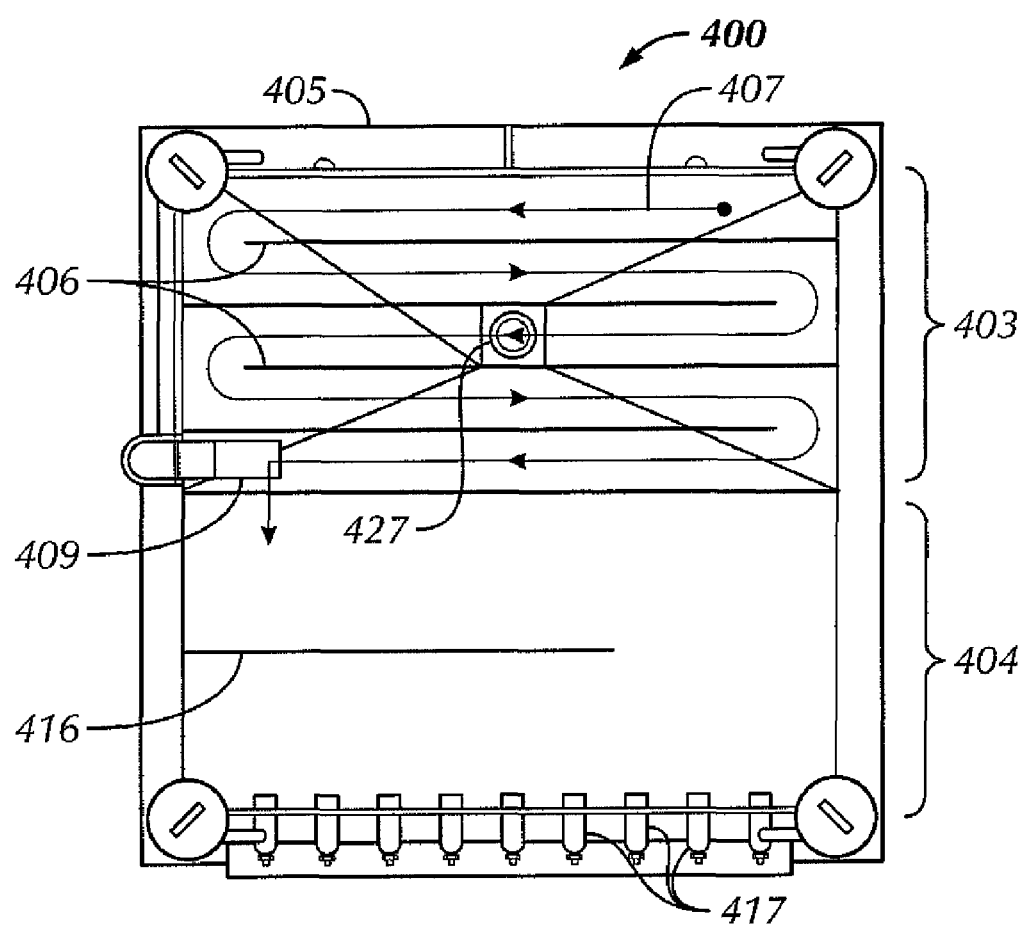
FIG. 4 is a top view of a separator according to embodiments of the present disclosure.

Referring to FIG. 4, a top view of a separator 400 according to embodiments of the present disclosure is shown. In this embodiment, separator 400 includes a first partition 403 and a second partition 404 of a separation tank (not independently referenced). A fluid may be injected at inlet 405 into first partition 403, wherein a plurality of baffles 406 may direct the flow of drilling fluids through first partition 403 along flow path 407. As the fluid follows flow path 407, a dense phase may drop out of the fluid and be discharged through outlet 427. While the dense phase drops out of the fluid, hydrocarbons entrained in the fluid may separate from a water phase, such that the water phase may be removed from first partition 403 via first outlet 409.

In this embodiment, weir flow path 407 causes the fluid to travel at least five times across the width of separator 400. In one aspect, a separator 400 having a separation tank that is 1.5 meters in width may thus provide a weir flow path 407 of 7.5 meters. As discussed above, by increasing the length of weir flow path 407, the time fluid remains in first partition 403 may be increased, thereby increasing the volume of dense phase that drops out of the fluid, as well as increasing the hydrocarbons separated from the water phase. After the hydrocarbon phase travels through the fifth weir/baffle and into second partition 404, the hydrocarbons may be removed via opening one of valves 417. Because some volume of residual water phase may flow into second partition 404, secondary baffles 416 may be included in second partition 404 to provide the fluid greater time in second partition 404. Those of ordinary skill in the art will appreciate that secondary baffles 416 may not be necessary, and in such embodiments not having secondary baffles 416, the oil may be removed directly from second partition 404 without additional settling time.

In certain embodiments, additional features may be added to separator 400 to further enhance hydrocarbon and water phase recovery. In one aspect, an additional water phase outlet (not independently illustrated) may be included in second partition 404 to provide for the discharge of residual water phase that enters the partition with the hydrocarbons. Such an additional water phase outlet may be piped into first outlet 409, such that additional water phase may be collected.

Additional design features that may be incorporated into embodiments disclosed herein include, covers for the separation tank and hydrocarbon conduit, hydrocarbon cleanout drains, to allow hydrocarbons to be flushed from the support structure, and suction pipes that allow the pumps to remove hydrocarbons and/or water that may have fallen on a drip pad beneath the separation tank. Such features may allow additional hydrocarbons and water phase to be collected, thereby increasing the cleanliness of the separatory operation.

Figure 5:
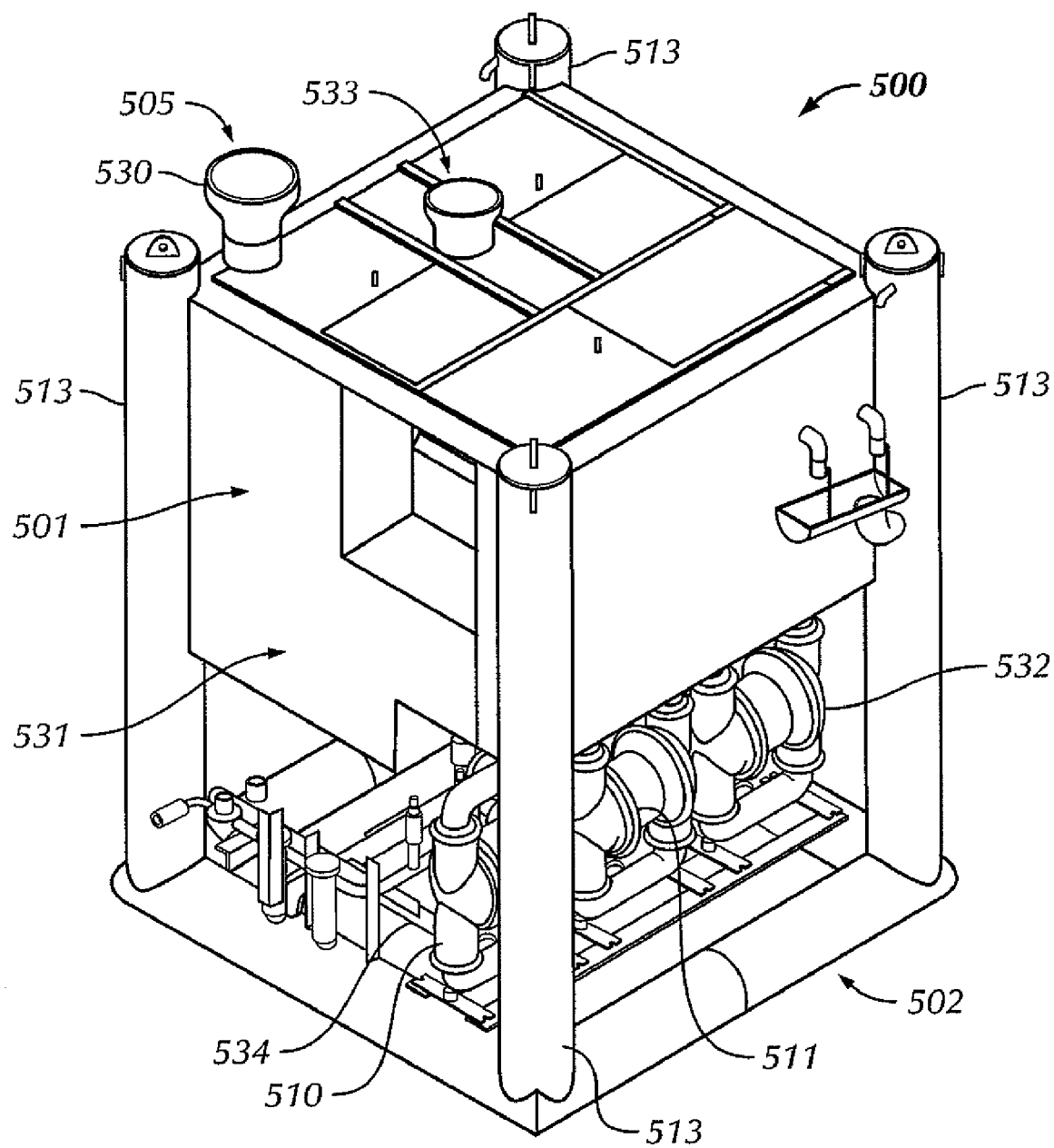
FIG. 5 is a perspective view of a separator according to embodiments of the present disclosure.

In alternate embodiments, specific design elements of the present disclosure may be varied to further provide for the separation of hydrocarbons, water, and/or a dense phase from a fluid. Referring to FIG. 5, a perspective view of a separator 500 according to an embodiment of the present disclosure is shown. In this embodiment, separator 500 includes a separation tank 501 having multiple partitions (not shown). Separator 501 also has an inlet 505 for receiving a fluid. In this embodiment, inlet 505 is a conduit including a receiving portion 530, such as a 10 inch receiver portion, configured to receive a flow of fluid from a drain pipe system of, for example, a shaker house and/or rig floor. The geometry of receiving portion 530 may allow separator 500 to receive a flow of fluids from multiple diameter drain pipes, as well as provide for an air gap between a drain pipe termination and the receiving portion 530, thereby preventing separator 500 from becoming pressurized.

Upon entering separation tank 501, the fluid is separated into a dense phase, hydrocarbon phase, and water phase, as described with respect to FIGS. 1-4. As previously described, the dense phase may settle into a dense phase collection partition 531 of separation tank 501, while the hydrocarbon phase and the water phase are directed either out of separator 500 or into a portion of support structure 502, such as a leg 513, of separator 500.

In this embodiment, separator 500 include three pumps (e.g., air diaphragm pumps), a first pump 510 configured to remove the water phase from the separator, a second pump 511 configured to remove the hydrocarbon phase from the separator, and a third, dense phase, pump 532, configured to remove the dense phase from the separator. Thus, in this embodiment, each phase includes a dedicated pump assigned for the removable of a discrete phase of hydrocarbons, water, or dense material. During operation, each pump may be controlled by an electric solenoid that opens or closes an air valve that feeds the pump, thereby allowing the pump to be turned on or off via the contact closure of an associated switch. To determine the level of dense phase, in separation tank 501 and/or dense phase collection partition 531, a dense phase level switch 533 may be disposed in separation tank 501 and/or dense phase collection partition 531. Thus, as the dense phase accumulates in collection partition 531, the dense phase level switch 533 may detect a level of dense phase, and when the dense phase reaches a pre-set point, the dense phase level switch 533 may close the circuit to pump 532, thereby allowing the dense phase to be removed from separator 500. Examples of level switches that may be used according to the embodiments disclosed herein include multipoint liquid level sensors, such as the MS50, commercially available through K-TEK Corporation, Prairieville, La.

In addition to dense phase level switch 533, separator 500 may also include hydrocarbon and water level switches disposed on separator 500 and/or support structure 502, such that as the level of hydrocarbon and/or water in separator 500 reaches pre-set points, the switches may close the circuit to associated pumps 510 and 511, thereby allowing hydrocarbons and/or water to be removed from the separator. Because the set points may be determined in advance, the removal of hydrocarbons, water, and/or dense phase from separator 500 may be substantially automated. Furthermore, all three pumps 510, 511, and 532 are interconnected through piping 534, thereby allowing any of pumps 510, 511, and/or 532 to remove hydrocarbons, water, and/or dense phase. Thus, if one or more of pumps 510, 511, and/or 532 is inoperable, an operator may actuate a bypass mode for separator 500, thereby allowing, for example, dense phase pump 532 to remove hydrocarbons and/or water from the separator. Such design may thereby allow separator 500 to function even if one or more of pumps 510, 511, and/or 532 become inoperable.

Depending on the requirements of the operation, pumps 510, 511, and/or 532 may supply the water, hydrocarbons, and dense phase to multiple locations on a rig for reuse or disposal. For example, in certain embodiments, the water phase may be sent to the non-potable water system on the rig for reuse. Additionally, the water phase may be reused in the active mud system to make up new mud, or may be sent overboard for disposal. The hydrocarbon phase may be transmitted to separatory apparatus, such as shakers, and then returned to the active mud system, or alternatively, may be centrifuged on site. The dense phase, which may include emulsions from the rig floor and shaker house, may be pumped from the system to a separatory apparatus, such as a fine mesh shaker, and then returned to the active system. Additionally, the dense phase may be sent to a centrifuge and/or a cuttings drying prior to return to the active system or disposal.

In operation, a fluid containing hydrocarbons, a water phase, and dense phase is injected into a separation tank. After the fluid is injected, the fluid is passed through a plurality of baffles to increase the time the fluid remains in the separation tanks, thereby increasing the likelihood of the dense phase falling/dropping out of the fluid. In certain embodiments, the fluid may be passed along a generally serpentine flow path, thereby allowing the dense phase to separate out of the fluid, and the hydrocarbons to layer on top of the water phase. After the hydrocarbons have substantially separated from the water phase, the water phase may be removed from the separation tank to a substantially hollow support structure for storage prior to discharge. While the water phase is removed to the support structure, the hydrocarbon phase may also be removed to a substantially hollow support structure. Those of ordinary skill in the art will appreciate that in certain embodiments, both the water phase and the hydrocarbon phase may be removed simultaneously, while in other embodiments, each phase will be removed independent from the other.

During operation, a dense phase may be discharged from the separation tank via actuation of a pump. The pumps may thus be used to pump the dense phase, the water phase, or the hydrocarbon phase from a component of the separator. The products of the operation may be pumped, for example, overboard, to downstream cleaning operations, active pits, storage pits, shakers, centrifuges, filtration devices, or to other components of a drilling operation as are known in the art. Additionally, during cleaning, discharging, pumping, or separating operations, a gas may be vented from one or more members of the support structure to prevent a pressure build-up therein.

To increase the efficiency of the separatory operation, sensors, PLCs, and computers may be used to determine a capacity of dense phase, water phase, or hydrocarbon phase. Such measurements and determinations may be made in the separation tank, during discharge, or at any other portion of the operation. In certain embodiments not using sensors, PLCs, and computers, a drilling operator may manually actuate the pumps and/or valves to control the flow of dense phase, water, and/or hydrocarbons. To assist in determining levels of such products, additional design features may be added to portions of the separator. Examples of additional design features may include, windows in the separation tank so a fill level may be observed, and windows in the support structure so a support structure capacity may be determined, external water clarity adjustments, external oil level clarity adjustments, and automation capabilities.

Those of ordinary skill in the art will also appreciate that separators in accordance with embodiments disclosed herein may be a component in environmental/waste management systems. As such, the fluids exiting the separator may be discharged to further waste remediation devices. Moreover, in certain embodiments, the fluid entering the separator may have previously been exposed to certain conditioning operations to further enhance the separation of hydrocarbons from water and the dropping out of a dense phase from the water. Examples of conditioning may include the adding of surfactants and/or flocculants to the fluid prior to separation. Such conditioners may thereby increase the volume of dense phase and hydrocarbons removed from the fluid. Those of ordinary skill in the art will appreciate that additional conditioners may also be used instead of or in addition to those described to further enhance the separatory operations disclosed herein.

Advantageously, embodiments of the present disclosure may provide systems and methods for separating hydrocarbons and a dense phase from water. Because the unit as described herein is substantially self-contained, the separator may be added to existing rig infrastructure with little modification to the rig itself. Furthermore, the separator may be incorporated as a step in a more extensive waste management system. As such, the water clarity level may be adjusted via inclusion of, for example, sand and/or an element-type filter mounted downstream of the pumps.

Also advantageously, embodiments of the present disclosure may allow for a separator that provides virtually hands free operation for cleaning fluids from rig floor run-off and shaker decks. Furthermore, the systems and methods disclosed herein may be used with fresh and saltwater, as well as on operations using oil-based drilling fluids.

Finally, embodiments of the present disclosure may provide rig operators a process for cleaning fluids at a rate up to and over 150 gallons per minute. The separators may allow drilling operators the ability to collect and process varying degrees of emulsified mixtures, drop out the dense phase in the mixture, separate water from hydrocarbons, and send each waste stream to a desired location in a discrete stream. Moreover, because of the substantially hollow support structure used to contain the separator, embodiments disclosed herein may also allow for the storage of such discrete streams.

While the present disclosure has been described with respect to a limited number of embodiments, those skilled in the art, having benefit of this disclosure, will appreciate that other embodiments may be devised which do not depart from the scope of the disclosure as described herein. Accordingly, the scope of the disclosure should be limited only by the attached claims.

What is claimed:

1. A system for separating a fluid comprising:
    an inlet for receiving the fluid, the fluid comprising a water phase and a hydrocarbon phase;
    a separation tank having a first partition and a second partition, wherein the first partition is configured to receive the fluid from the inlet;
    a first outlet configured to receive the water phase from the first partition;
    a second outlet configured to receive the hydrocarbon phase from the second partition; and
    a support structure configured to receive the water phase from the first outlet and the hydrocarbon phase from the second outlet, wherein said support structure is physically connected to said separation tank, and wherein said support structure comprises a plurality of substantially hollow legs configured to hold fluids.
2. The system of claim 1, further comprising:
    a first pump configured to provide a flow of water phase from the support structure to a discharge port.
3. The system of claim 2, further comprising:
    a second pump configured to provide a flow of hydrocarbon phase from the support structure to a second discharge port.
4. The system of claim 1, the separation tank further comprising:
    a dense phase collection partition.
5. The system of claim 4, wherein the dense phase collection partition comprises an angled lower section.
6. The system of claim 4, further comprising:
    a dense phase pump configured to provide a flow of a dense phase from the dense phase collection partition to a discharge port.
7. The system of claim 4, further comprising:
    a level switch configured to determine a level of the dense phase in the dense phase collection partition.
8. The system of claim 1, wherein the support structure comprises substantially hollow supports.
9. The system of claim 8, wherein the substantially hollow supports comprise a vent.
10. The system of claim 1, wherein the first partition comprises a plurality of baffles.
11. The system of claim 10, wherein the first outlet comprises at least one of a J-shaped, U-shaped, or S-shaped geometry.
12. The system of claim 10, wherein the first outlet comprises a valve.
13. The system of claim 1, wherein the second outlet comprises a plurality of hydrocarbon discharge ports.
14. The system of claim 1, further comprising:
    a programmable logic controller configured to provide instructions to control a discharge cycle of at least one pump.
15. The system of claim 1, wherein the inlet comprises a soft receiver.
16. The system of claim 1 wherein the support structure is physically integral with the separation tank.

17. A method of separating a fluid into a water phase, a dense phase, and a hydrocarbon phase, using a fluid separation system as in claim 1, the method comprising:
- injecting the fluid containing the water phase and the hydrocarbon phase into a separation tank,
- separating the water phase from the hydrocarbon phase, wherein the separating comprises transmitting the fluid through a plurality of baffles;
- collecting the water phase;
- collecting the hydrocarbon phase, and
- storing at least one of the water phase and the hydrocarbon phase in a substantially hollow support structure of said fluid separation system.

18. The method of claim 17, wherein the separating further comprises:
- removing the dense phase from the fluid.

19. The method of claim 17, wherein the transmitting the fluid through a plurality of baffles comprises transmitting the fluid along a substantially serpentine flow path.

20. The method of claim 17, further comprising:
venting a gas from the substantially hollow support structure.

21. The method of claim 17, further comprising:
pumping at least one of dense phase, the water phase, and the hydrocarbon phase from the substantially hollow support structure.

22. The method of claim 17, further comprising:
determining a volume of at least one of the dense phase, the water phase, and the hydrocarbon phase.

23. The method of claim 17, further comprising:
determining a dense phase level; and
automatically actuating a pump configured to remove the dense phase when a specified dense phase level is determined.

\* \* \* \* \*